I. C. BENSON.
IRRIGATING DEVICE.
APPLICATION FILED DEC. 22, 1914.
1,143,351.
Patented June 15, 1915.
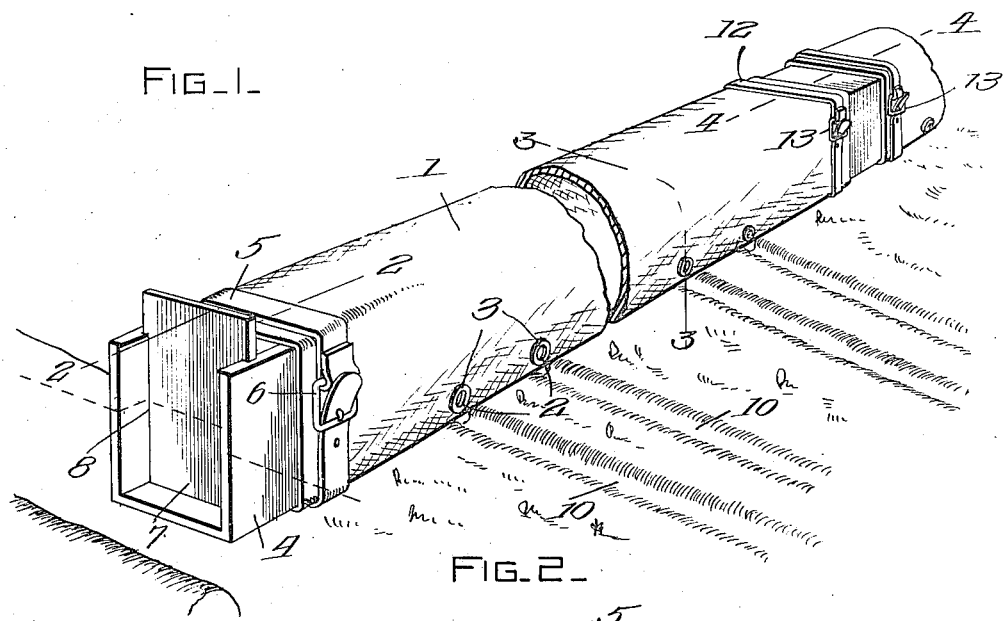
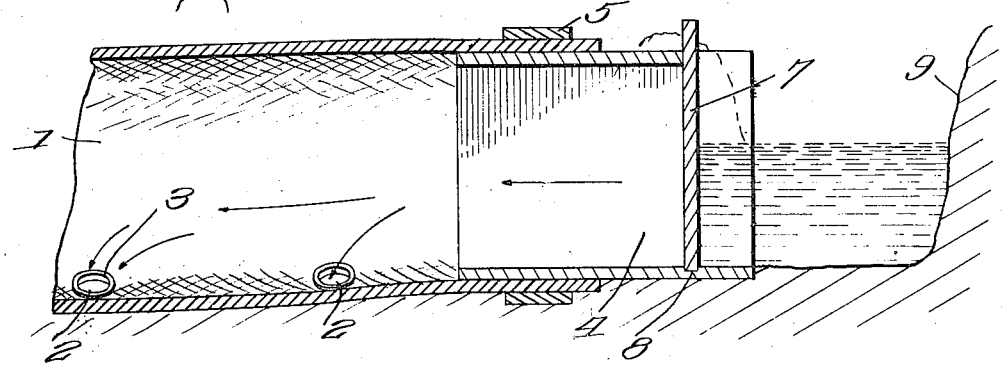
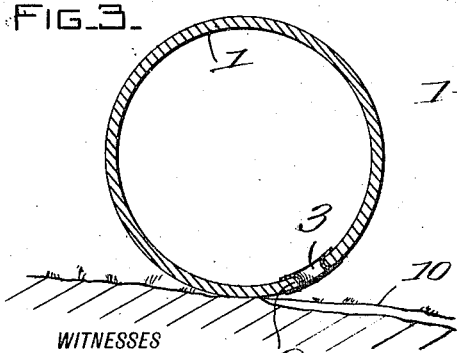
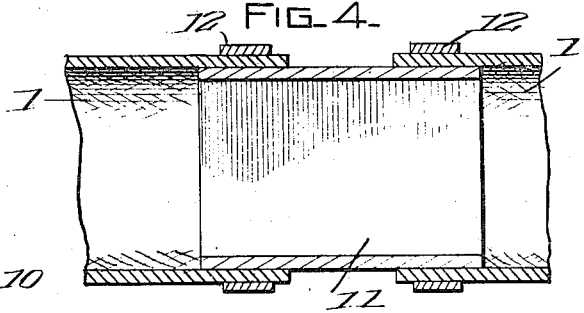
WITNESSES
INVENTOR
Ira C. Benson
BY
ATTORNEYS

UNITED STATES PATENT OFFICE.

IRA COLUMBUS BENSON, OF SILVER CITY, IDAHO.

IRRIGATING DEVICE.

1,143,351.  Specification of Letters Patent.  Patented June 15, 1915.

Application filed December 22, 1914. Serial No. 878,525.

*To all whom it may concern:*

Be it known that I, IRA C. BENSON, a citizen of the United States, and a resident of Silver City, in the county of Owyhee and State of Idaho, have invented a new and useful Improvement in Irrigating Devices, of which the following is a specification.

My invention is an improvement in irrigating devices, and has for its object to provide a device of the character specified, to be used in connection with the laterals of irrigating systems for distributing the irrigating water from the lateral to the soil in a uniform and thorough manner and without waste of the water.

In the drawings: Figure 1 is a perspective view of the device in use, and Figs. 2, 3 and 4 are sections on the lines 2—2, 3—3 and 4—4, respectively, of Fig. 1.

As is known in irrigating, the water which is collected in reservoirs or the like, is conveyed through canals to the place of utilization. At the place of utilization small ditches are run off, called laterals, the laterals carrying the water to the individual users. The water from the laterals is distributed by furrows or small ditches cut in any desired manner, and the flow of the water is controlled by gates or valves.

The present invention is intended for use in connection with the laterals, and as shown, the improvement comprises a tubular conductor or casing 1 of suitable material, the said conductor being in fact a hose, and the conductor is provided at intervals with openings 2, the said openings being at the bottom and at one side of the conductor as shown more especially in Fig. 3.

In the present instance the conductor is provided with an eyelet 3 at each of the openings, the eyelets reinforcing the openings, and retaining them in open condition. The conductor or hose is intended for connection with a rigid casing 4 of tubular form, the end of the conductor or hose being slipped over the end of the casing, as shown in Figs. 1, 2 and 4, and a strap 5 is provided for securing the end in place.

The strap 5 is passed around the conductor or hose outside of the same and around the casing 4, and one end of the strap is provided with a buckle 6, which is engaged with the opposite end to secure the strap from displacement. The casing 4 may be closed by a head gate 7, the said gate having its side edges received in grooves 8, in the side walls and bottom of the casing 4.

It will be noted from an inspection of Figs. 1 and 2, that the gate extends above the top of the casing 4 to provide a handle for operating the gate. The tubular casing 4 extends through one wall of the lateral indicated at 9, and the gate 7 when closed, prevents the flow of the water from the lateral into the hose.

The openings 2 are arranged at intervals corresponding to the irrigating furrows or grooves of the field being irrigated, and the hose is so arranged that the said openings register with the grooves or furrows, the said grooves or furrows being indicated at 10. The conductors are preferably provided in sections of convenient length, and they may be connected by the mechanism shown in Figs. 1 and 4.

The connecting mechanism comprises a casing 11 of tubular form and rectangular cross section, and of an external area to fit within the end of the conductor. The meeting ends of the conductors are slipped over the ends of the casing 11, as shown in Figs. 1 and 4, and straps 12 are passed around the ends of the casing, and around the ends of the conductors to secure the said ends from slipping off the casing.

Each of the straps 12 is provided at one end with a buckle 13, for engagement by the other end of the strap. The casings 11 are of such length that when the conductors are in place thereon, they will be spaced apart from each other. Each length or section of conductor is provided with the openings 2, each opening being reinforced by an eyelet for the purpose specified, and it will be obvious that as many sections may be used, connected together by the casings 11, as may be found advisable. Enough sections will be used at each head gate 7 to permit the full width of the field or piece of ground to be irrigated, and as many head gates will be provided as will be necessary in the length of the lateral.

In use, one end of a conductor section is slipped over the casing 4, and secured in place by means of a strap 5. If one length is sufficient, the gate is opened and it will be evident that as the water flows from the lateral through the casing 4, it will be distributed by the conductor through the openings 2 to the furrows to thoroughly irrigate the growing plants. If more than one section of conductor is necessary the other sections are connected by means of the connecting casings 11 until the required length is obtained. The casing 4 is of a size to permit the flow of water required.

It will be noted especially from an inspection of Fig. 1 that the conductor sections are tapering in form, gradually decreasing in cross section from the casing 4 toward their outer ends. The connecting sections 11 are not tapering, but each succeeding section of conductor has its large end of approximately the same area as the small end of the succeeding section.

With this arrangement the head gate 7 may be left open permanently to permit a flow of water sufficient to suffice for the needs of irrigation. There can be no washing or erosion with the use of the improved device, because the small amount of water that is discharged from each opening 2 is not sufficient to disturb the soil to any extent. The water merely trickles through the opening and is absorbed by the ground, until it becomes saturated, after which the water will flow through the furrow 10. Because of the tapering character of the conductor the same amount of water is discharged at each opening 2, and the discharge throughout the length of the conductor is uniform. It will be understood that the outermost end of the conductor is closed, so that the water must flow out through the openings 2.

In order to irrigate rolling land the water must be applied gently and uniformly over the entire surface. The soil is first prepared for irrigation by making it smooth and as uniform as possible. The furrows or grooves 10 are then marked across the fields at distances corresponding to the spacings of the openings 2. The conductor is then placed and the head gate opened after which the device requires no further attention until it is desired to shut off the water. Practically every drop of water that flows from the lateral is utilized to irrigate, and there is no waste. In addition the service of the laborers ordinarily required to attend to the irrigation is dispensed with.

I claim:—

A device of the character specified, comprising a conductor composed of a series of tubular sections of flexible material, each of the said sections being tapering in form and the large end of each section being of approximately the same size as the small end of the succeeding section, each section having a longitudinally extending series of openings, each opening being reinforced, a tubular connector for the adjacent ends of successive sections, each connector comprising a casing of rectangular form over which the meeting ends of the sections are fitted, and an inlet casing of tubular form and rectangular cross section over which the inlet end of the conductor is fitted, said casing having guides, and a head gate fitting in the guides, and straps of flexible material encircling the ends of the sections at the connectors and at the inlet casing.

IRA COLUMBUS BENSON.

Witnesses:
 JOHN THOMAS SMITH,
 JOHN STEPHAN FLANAGAN.